(12) United States Patent
Schenk

(10) Patent No.: US 8,532,853 B2
(45) Date of Patent: Sep. 10, 2013

(54) DRIVE-TRAIN SYSTEM OF A VEHICLE, AND METHOD FOR CONTROLLING THE OPERATION OF A DRIVE-TRAIN SYSTEM OF A VEHICLE

(75) Inventor: Rene Schenk, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 409 days.

(21) Appl. No.: 12/735,407

(22) PCT Filed: Nov. 12, 2008

(86) PCT No.: PCT/EP2008/065399
§ 371 (c)(1),
(2), (4) Date: Oct. 18, 2010

(87) PCT Pub. No.: WO2009/089942
PCT Pub. Date: Jul. 23, 2009

(65) Prior Publication Data
US 2011/0029174 A1    Feb. 3, 2011

(30) Foreign Application Priority Data
Jan. 15, 2008 (DE) .............................. 102008004366

(51) Int. Cl.
*B60L 9/00* (2006.01)

(52) U.S. Cl.
USPC ......................................................... 701/22

(58) Field of Classification Search
USPC ......................................................... 701/22
See application file for complete search history.

(56) References Cited

U.S. PATENT DOCUMENTS

| | | | |
|---|---|---|---|
| 7,645,209 B2 * | 1/2010 | Dreibholz et al. ................. | 477/5 |
| 2002/0112901 A1 * | 8/2002 | Yamaguchi et al. ......... | 180/65.2 |
| 2002/0195287 A1 * | 12/2002 | Kayukawa et al. .......... | 180/65.2 |
| 2003/0033060 A1 * | 2/2003 | Okoshi ........................... | 701/22 |
| 2003/0062206 A1 * | 4/2003 | Fujikawa ...................... | 180/65.2 |
| 2004/0231627 A1 * | 11/2004 | Kaita et al. .................. | 123/179.3 |
| 2007/0099749 A1 * | 5/2007 | Zillmer et al. .................... | 477/3 |
| 2008/0083579 A1 * | 4/2008 | Okuda et al. .................. | 180/293 |
| 2009/0062062 A1 * | 3/2009 | Choi ................................. | 477/5 |

FOREIGN PATENT DOCUMENTS

| | | |
|---|---|---|
| DE | 10 2004 002061 | 8/2005 |
| DE | 10 2004 032173 | 2/2006 |
| DE | 10 2006 005468 | 8/2007 |
| DE | 10 2006 048358 | 4/2008 |
| EP | 1 418 083 | 5/2004 |

\* cited by examiner

*Primary Examiner* — Hussein A. Elchanti
(74) *Attorney, Agent, or Firm* — Kenyon & Kenyon LLP

(57) ABSTRACT

A drive-train system of a vehicle having at least one internal combustion engine, which may be started using an electric machine able to be coupled thereto via a clutch and controllable via an engine-speed controller. A control value of the engine-speed controller is detected toward the end of at least one startup operation of the internal combustion engine while the clutch is still subject to slip, and a comparison of the control value with a setpoint value is used to determine a value deviation, which is able to be compensated with the aid of a correction value in a renewed startup operation. Furthermore, a corresponding method is also described.

10 Claims, 1 Drawing Sheet

DRIVE-TRAIN SYSTEM OF A VEHICLE, AND METHOD FOR CONTROLLING THE OPERATION OF A DRIVE-TRAIN SYSTEM OF A VEHICLE

FIELD OF THE INVENTION

The present invention relates to a drive-train system of a vehicle, and to a corresponding method for controlling the operation of a drive-train system of a vehicle having the features.

BACKGROUND INFORMATION

A drive-train system of a vehicle and a method for controlling the operation of a drive-train system of a vehicle of the type mentioned in the introduction are generally known. The generic drive-train system includes at least one internal combustion engine, which can be started with the aid of an electric machine which is able to be coupled to it with the aid of a clutch and is able to be controlled with the aid of an engine-speed controller. The two drive machines form what is called a hybrid drive. The concept of the hybrid drive is becoming ever more important in automotive technology because it provides fuel economy, a reduction in emissions as well as an improvement in the subjective driving experience. In addition to the internal combustion engine, the hybrid drive has at least one further drive source, which does not require fossil fuels for its operation. In the case at hand, the electric machine is used as additional drive source. A suitable operating strategy makes it possible to utilize the advantages of the different drive sources to optimum effect and to avoid any disadvantages. The combination of the internal combustion engine with the electric machine is the predominent development.

Vehicles having a hybrid drive have lower fuel consumption than conventional vehicles, i.e., vehicles driven exclusively via the internal combustion engine. The savings in consumption are due to the hybrid-specific options of what is referred to as energy recuperation during a braking operation, and the implementation of start-stop functions. In hybrid drives a differentiation is made between a parallel hybrid, a serial hybrid, and a split hybrid. All share the feature of using two energy stores, i.e., a battery and a fuel tank. Capacitors are also able to be used as an alternative to the battery. A further differentiating feature in hybrid drives is the capacity of the individually employed electric machine. In this context it is distinguished between a mild hybrid and a full hybrid, the full hybrid being a vehicle that is at least intermittently able to drive using the electric drive alone. So-called powersplit hybrid drives are not considered for the technical approach in the case in hand, since their startup operation takes a different course so that the problem underlying the exemplary embodiments and/or exemplary methods of the present invention does not arise. Furthermore, so-called starter generators are known whose electric machine is permanently connected to the crankshaft of the internal combustion engine, however, which means that the problem of the synchronization between the internal combustion engine and the electric machine is not an issue.

SUMMARY OF THE INVENTION

In contrast, the drive-train system of a vehicle according to the exemplary embodiments and/or exemplary methods of the present invention and having the features described herein has the advantage that in purely electric driving mode, but faced with a higher power demand or a battery that is running low, the starterless internal combustion engine is able to be started by the electric machine without causing interruptions in the drive train. The clutch is used for this purpose, which is closed during the driving operation and is controlled to a defined slip torque. Using the slip torque provided by the electric machine, the internal combustion engine is then able to be accelerated until it has reached the same rotational speed as the electric machine and an engine-speed alignment in the sense of a rotational-speed adaptation, i.e., am engine-speed synchronization, comes about as a result. In the process, a control value of the engine-speed controller is recorded toward the end of at least one startup operation of the internal combustion engine while the clutch is still subject to slip, and a comparison of the control value with a setpoint value is used to determine a value deviation, which is able to be compensated with the aid of a correction value in a renewed startup operation. The same applies in analogous manner to the method for controlling the operation of a drive-train system of a vehicle, having the features described hereinn.

Advantageous further refinements are derived from the features further described herein.

In one advantageous development of the exemplary embodiments and/or exemplary methods of the present invention, the correction value is able to be determined as a fixed value, via a correction factor or as a function of the magnitude of the control value. Depending on the use and application situation, the most suitable variant may be employed in order to achieve an appropriate corrective effect requiring the least possible effort.

In one further advantageous development of the exemplary embodiments and/or exemplary methods of the present invention, the internal combustion engine and/or the electric machine are/is able to be brought into operative connection with an automatic transmission by way of a hydraulic torque converter. When the transmission is included which is able to be coupled to the drive-train system developed as a drive-train section, then a comprehensive drive train is produced, which as such is able to be installed in a vehicle, especially a motor vehicle.

In one exemplary development of the exemplary embodiments and/or exemplary methods of the present invention, the internal combustion engine and/or the electric machine are/is able to be coupled directly to the automatic transmission with the aid of a torque-converter lockup clutch. The direct coupling of at least one of the machines with the transmission produces a slipfree drive train and thus a direct power transmission behavior.

In one further exemplary development of the exemplary embodiments and/or exemplary methods of the present invention, the electric machine is in operative connection with an energy store, particularly a rechargeable battery. On the one hand, the electric machine in its function as drive unit is supplied with energy by the battery, and on the other hand, the electric machine charges it in its function as generator. In the latter function, the electric machine is driven by the internal combustion engine.

The advantages of the basic described embodiments apply analogously to the features of the further described embodiments as well.

The exemplary embodiments and/or exemplary methods of the present invention as well as advantageous developments according to the further features are explained in greater detail in the following text with the aid of the exemplary embodiments illustrated in the drawing without restricting the present invention in this regard; instead, the exemplary embodiments and/or exemplary methods of the present

DETAILED DESCRIPTION

Figure 1:
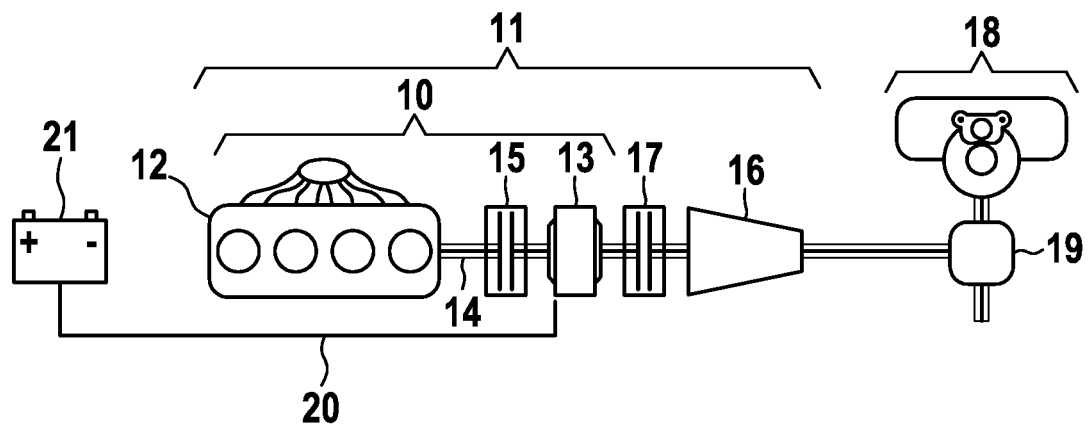
FIG. 1 shows a schematized representation of a complete drive train system including a unit for the torque transmission, particularly a wheel drive, and an energy store, particularly a rechargeable battery.

FIG. 1 shows a drive train system 10 as part of a drive train 11. Drive train system 10 has an internal combustion engine 12 and an electric machine 13, which are able to be coupled via a shared drive shaft 14 with the aid of a clutch 15. Via shared drive shaft 14, electric machine 13 is also in operative connection with a transmission 16, by way of a hydraulic torque converter. Using an additional clutch 17, especially a torque-converter lockup clutch, direct and slipfree coupling between electric machine 13 and transmission 16 is able to be achieved. If both clutches 15; 17 are closed, then internal combustion engine 12 is coupled to transmission 16 as well. Transmission 16 may be implemented as a so-called automatic transmission, which ultimately is in mechanical connection 19 with a torque-transmission unit 18, particularly a wheel drive, via drive shaft 14. In addition, an electrical operative connection 20 exists between electric machine 13—also referred to as electromachine—, and an energy store 21, particularly a rechargeable battery.

Such a design of drive train 11 is referred to as fuel/electric hybrid drive or parallel hybrid of the P2 type, in which electric machine 13 is typically installed after clutch 15 and before transmission 16. Additional variants among the parallel hybrids are the P1, the P3, and the P4 hybrids. In the P1 hybrid, electric machine 13 is positioned on drive shaft 14, particularly the crankshaft, directly behind internal combustion engine 12, i.e., in front of clutch 15 and transmission 16. In the P3 hybrid, electric machine 13 is positioned at an end of transmission 16 facing away from clutch 15. In the P4 hybrid finally, electric machine 13 does not act on the same drive shaft 14 as internal combustion engine 12, but instead is situated on a separate shaft.

The P2 configuration of drive shaft 11 enables a purely electric driving operation using electric machine 13 while clutch 15 is open. If increased power is demanded or energy store 21 has been depleted too heavily, then starterless internal combustion engine 12 is connected, i.e., started up, via clutch 15 and using electric machine 13, while the vehicle is driving, in such a way that no interruptions are caused in drive train 11. In the process, clutch 15 is controlled to a defined slip torque for the purpose of accelerating internal combustion engine 12 until it has attained the same rotational speed as electric machine 13. The additional torque must be provided by electric machine 13 in this case.

A control of electric machine 13 by the additional torque is not readily possible because imprecise information about the clutch torque, both with regard to its amount and its time characteristic. During a startup operation, the engine speed of electric machine 13 is therefore controlled in addition. The engine speed regulation is possible because the torque-converter lockup clutch 17 of the torque converter is opened at the beginning of the startup operation. This results in slip at the converter, which must be provided for by a slip speed. The slip is a function of the drive torque to be transmitted and may also be predefined from the transmission in an alternative development. The engine speed of electric machine 13 is able to be measured very well and is dynamically controllable. In principle, an excellent startup sequence may be achieved through such a combination of precontrol und regulation.

In the event of large errors between the clutch torque precontrolled to electric machine 13, which is defined on the basis of a compression force applied via clutch 15, and the actual clutch torque, the engine speed control is unable to correct the error due to the extremely dynamic nature of the process. Thus, a method for determining the accuracy of the actual clutch torque, and thus the precontrol torque, is utilized. This method is also referred to as adaptation of the precontrol torque to the required clutch torque. An adaptation in this case means an adjustment, i.e., synchronization, of the precontrol torque to the required clutch torque.

According to one known method, in a startup where the gear-shift lever is in position P or N, clutch 15 is first brought into slipping operation. Then, clutch 15 is slowly closed until internal combustion engine 12 starts up. During this process, the clutch torque equals the torque generated by electric machine 13, at least as long as the engine speed does not fluctuate too heavily. Thus, the actual clutch torque is able to be measured via the electric machine and is available as correction value. However, the disadvantage of this method is that it considerably prolongs the startup in the N or in the P position. Furthermore, the adaptation may take place only in startups that are usually possible only in an initial startup using an ignition key.

However, according to the exemplary embodiments and/or exemplary methods of the present invention it is possible to implement the correction in virtually every repeated startup or new startup, without direct intervention in the startup operation as such, i.e., based purely on the metrological recording of the startup operation. Toward this end, the control value of the engine speed controller is monitored toward the end of each startup operation, that is to say, as long as clutch 15 is still subject to slip.

If the control value deviates from a precontrol value derived from the setpoint value of the clutch or the actual value of the clutch, then this is an indication that the clutch value is subject to the influence of a fault. Thus, a correction of the clutch characteristics map is calculated from the deviation, which then becomes effective in a renewed startup of internal combustion engine 12 or the renewed operation of the clutch. In the next startup the controller therefore starts using an already improved precontrol. Following multiple operations of this kind, the precontrol is then fine-tuned in such a way that only minimal interventions of the control will be necessary forthwith. The essential advantage is that the adaptation is able to take place continuously during each startup operation, in the sense of an iteration, and that the actual beginning of the startup is not adversely affected. The iteration denotes a method in which a stepwise but targeted approximation to a solution of an arithmetic problem takes place. It consists of the repeated application of the same arithmetic method.

Figure 2:
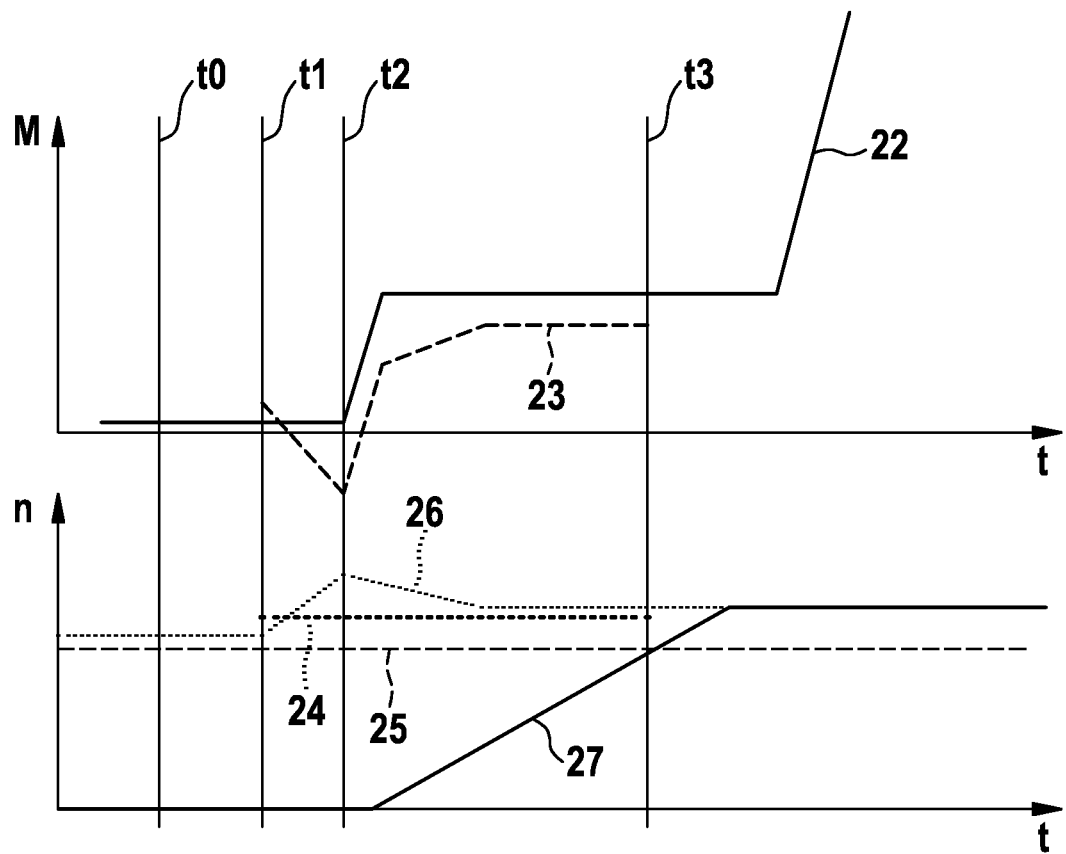
FIG. 2 shows a function diagram for the schematized illustration of an engine-speed adaptation between an electric machine and an internal combustion engine.

According to FIG. 2, a function diagram is shown for the schematized illustration of an engine-speed adaptation between electric machine 13 and internal combustion engine 12. Shown here are variables that are relevant for the adaptation during a renewed startup originating from the electric driving state. First, torque-converter lockup clutch 17 is closed, and electric machine 13 has a speed that is a function of the driving situation of the vehicle. While a torque-time diagram is shown in the upper part of the function diagram, the lower part of the function diagram shows an engine speed-time diagram. The torque-time diagram includes a graph 22 of an actual clutch torque on the one hand, and a graph 23 of a control torque including precontrol on the other. In addition, the engine speed-time diagram is provided with a level 24 of a setpoint engine speed, a further level 25 of a turbine engine speed of the torque converter, a graph 26 for the engine speed of electric machine 13, as well as a graph 27 for the engine speed of internal combustion engine 12.

A start is triggered at an instant t0. In so doing, torque-converter lockup clutch 17 of the torque converter is opened to begin with. At an instant t1, torque-converter lockup clutch 17 is open, so that an engine-speed differential is able to come about between a rotating turbine of the torque converter and electric machine 13. At this instant the control of the engine speed is activated and a setpoint engine-speed value is specified. Until the controller is able to actually adjust the engine speed, an engine-speed differential initially comes about, which corresponds to the currently existing torque conditions at the torque converter. At an instant t2, the closing of clutch 15 is then initiated to the slip value required for the startup of internal combustion engine 12. Once the correct torque has been attained, internal combustion engine 12 begins rotating and accelerates to the engine speed of electric machine 13. The startup operation is concluded when engine-speed equality has been reached, so that clutch 15 is able to be closed completely and a deactivation of the control takes place.

The adaptation is calculated at an instant t3, i.e., shortly before internal combustion engine 12 reaches the engine speed of electric machine 13. If the control torque, including the precontrol, has a lower value than the clutch torque at this instant, then less torque of electric machine 13 than specified by the characteristics map is obviously required for the compensation of clutch 15. In this case, the characteristics map of clutch 15 is modified in such a way that, forthwith, a higher actual clutch torque is adjusted at the same specified torque. The compensation will then require more electric machine torque during the next startup operation. If the control torque is greater than the clutch value, then the clutch characteristics map is modified appropriately in reverse manner. The modification may optionally amount to a fixed small offset or to a factor in each case. Furthermore, there is the possibility of making the magnitude of the modification additionally dependent upon the magnitude of the controller value as well. In general, the adaptation should be performed only if the startup operation satisfies certain marginal conditions. Such marginal conditions may include, for instance, that the engine speed of electric machine 13 lies within predefined limits, and/or the engine speed of electric machine 13 does not fluctuate too heavily during the process. No gear changes should take place during the process. Furthermore, a torque request, i.e., a torque specification of the vehicle driver, must not change too significantly during the process, and/or electric machine 13 must not reach a torque limit.

In principle, the adjustment of the specified engine speed is optimized by the adaptation due to an improvement in the precontrol. If the specified engine speed deviates considerably from the engine speed that electric machine 13 typically assumes at instant t1 due to the converter, then this circumstance may be corrected in the adaptation by calculating a correction value from the engine-speed difference between electric machine 13 and the specified engine speed at instant t1, which correction value is added to the difference between the control torque and the clutch torque. For example, the calculation of the correction value may be implemented via a characteristics map, from the converter characteristics. However, thereafter the specified engine speed will no longer be adjusted precisely due to this correction, but instead the setpoint selection is basically modified by a permanent control deviation of a P-controller. According to an optimized embodiment, the setpoint engine speed may likewise be adapted by measuring the engine-speed difference at instant t1.

As an alternative, it is also possible to wait with the actuation of the clutch until the engine-speed controller has adjusted the setpoint value. The control value required without clutch operation may then be deducted as offset from the control value with clutch operation. This would then also make it possible to measure the pure clutch influence. However, the additional waiting time would prolong the startup time.

What is claimed is

1. A drive-train system of a vehicle, comprising:
   an engine-speed controller; and
   at least one internal combustion engine, which is able to be started using an electric machine that is able to be coupled thereto via a clutch and controllable via the engine-speed controller;
   wherein a control value of the engine-speed controller is recorded toward the end of at least one startup operation of the internal combustion engine while the clutch is still subject to slip, and
   wherein a value deviation, which is determined based on a comparison of the control value with a setpoint value, is able to be compensated with the aid of a correction value in a renewed startup operation.

2. The drive-train system of claim 1, wherein the correction value is able to be determined as a fixed value, via one of a correction factor and as a function of the magnitude of the control value.

3. The drive-train system of claim 1, wherein at least one of the internal combustion engine and the electric machine is able to be brought into operative connection with an automatic transmission with the aid of a hydraulic torque converter.

4. The drive-train system of claim 1, wherein at least one of the internal combustion engine and the electric machine is able to be coupled directly to the automatic transmission with the aid of a torque-converter lockup clutch.

5. The drive-train system of claim 1, wherein the electric machine is in operative connection with an energy store, which is a rechargeable battery.

6. A method for controlling an operation of a drive-train system of a vehicle having at least one internal combustion engine, which is started by an electric machine which is able to be coupled thereto via a clutch and which is controllable via an engine-speed controller, the method comprising:
   recording, by the engine-speed controller, a control value of the engine-speed controller toward the end of at least one startup operation of the internal combustion engine while the clutch is slipping;
   comparing the control value with a setpoint value; and
   determining, based on the comparison, a value deviation which is compensated by a correction value during a renewed startup operation.

7. The method of claim 6, wherein the correction value is determined as a fixed value, via one of a correction factor and as a function of the magnitude of the control value.

8. The method of claim 6, wherein at least one of the internal combustion engine and the electric machine is brought into operative connection with an automatic transmission with the aid of a hydraulic torque converter.

9. The method of claim 6, wherein at least one of the internal combustion engine and the electric machine is coupled directly to the automatic transmission with the aid of a torque-converter lockup clutch.

10. The method of claim 6, wherein an energy store, which is a rechargeable battery, at least one of supplies the electric machine with energy and is recharged by the electric machine.

\* \* \* \* \*

UNITED STATES PATENT AND TRADEMARK OFFICE
CERTIFICATE OF CORRECTION

PATENT NO. : 8,532,853 B2  Page 1 of 1
APPLICATION NO. : 12/735407
DATED : September 10, 2013
INVENTOR(S) : Rene Schenk It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 503 days.

Signed and Sealed this

Fifteenth Day of September, 2015

Michelle K. Lee
*Director of the United States Patent and Trademark Office*